United States Patent [19]

Sipes, Jr. et al.

[11] Patent Number: 4,841,528
[45] Date of Patent: Jun. 20, 1989

[54] FREQUENCY DOUBLED, CAVITY DUMPED FEEDBACK LASER

[75] Inventors: Donald L. Sipes, Jr., Lisle, Ill.; Deborah L. Robinson, La Canada, Calif.

[73] Assignee: California Institute of Technology, Pasadena, Calif.

[21] Appl. No.: 240,205

[22] Filed: Sep. 6, 1988

[51] Int. Cl.$^4$ ............................................. H01S 3/10
[52] U.S. Cl. ........................................ 372/22; 372/26; 372/97; 372/11; 372/12; 372/69
[58] Field of Search ............... 372/97, 26, 12, 11, 372/22, 21, 69, 70, 71, 75

[56] References Cited

U.S. PATENT DOCUMENTS

| | | | |
|---|---|---|---|
| 3,564,454 | 2/1971 | Hook et al. | 372/17 |
| 4,413,342 | 11/1983 | Cohen et al. | 378/22 |
| 4,484,333 | 11/1984 | Chenausky et al. | 372/12 |
| 4,618,957 | 10/1986 | Liu | 372/22 |
| 4,637,026 | 1/1987 | Liu | 372/22 |

*Primary Examiner*—Léon Scott, Jr.
*Attorney, Agent, or Firm*—Freilich, Hornbaker, Rosen & Fernandez

[57] ABSTRACT

Higher efficiency in cavity dumping and frequency doubling in a laser used to produce modulated output beam pulses is achieved by deflecting light out of the resonant cavity to a third mirror through a frequency doubler using an electro-optic modulator and a polarizing beamsplitter in the resonant cavity, or using just an acousto-optic modulator to deflect light out of the laser cavity in response to a control signal (electric or acoustic). The frequency doubler in front of the third mirror rotates the frequency doubled light so that it will pass out of the laser cavity through the polarizing beamsplitter, while undoubled frequency light is reflected by the polarizing beamsplitter back into the gain medium of the laser. In the case of using a type-II frequency doubler, a dichroic beamsplitter deflects out the frequency doubled light and passes the undoubled frequency light to the polarizing beamsplitter for return to the laser gain medium. If an acousto-optic modulator is used, it deflects light out of the primary laser cavity, so a polarizing beamsplitter is not needed, and only a dichroic beamsplitter is needed to separate frequency doubled light out of the path from the third mirror.

10 Claims, 4 Drawing Sheets (Build-up Phase)

(Cavity-dump Phase)

(Build-up Phase)

(Cavity-dump Phase)

(Build-up Phase)

(Cavity-dump Phase)

FREQUENCY DOUBLED, CAVITY DUMPED FEEDBACK LASER

ORIGIN OF THE INVENTION

The invention described herein was made in the performance of work under a NASA contract, and is subject to the provisions of Public Law 96-517 (35 USC 202) in which the Contractor has elected to retain title.

TECHNICAL FIELD

The invention relates to continuously pumped or pulsed lasers, and more particularly to frequency doubling, cavity dumping as a way of obtaining a pulsed laser output.

BACKGROUND ART

For deep space communication, optical frequencies provide many advantages over presently used technologies. Higher data rates, less power and mass, and smaller beam divergence are some of the benefits provided by laser communications. Current space communication links incorporate either a ground-based station or an earth-orbiting spacecraft to send to and receive optical signals from mission spacecraft. Design considerations require the transmitter on the spacecraft to consist of a pulse position M-ary (PPM) modulated, frequency doubled, Nd:YAG laser operating a 0.532 $\mu$m. The anticipated range of communications rates for deep space is between 3 kbits/sec and 50 Mbits/sec (dependent on the range of the mission). Assuming M=256, this corresponds to nominal laser repetition rates between 380 Hz and 6.3 MHz. To achieve these rates of modulation, Q switching is utilized at the lower rates, and cavity dumping is utilized for the higher rates.

In laser Q-switching, lasing is held off by introducing loss into the resonator cavity while energy is pumped into and stored in the atomic population inversion. Once the desired inversion is attained, cavity losses are reduced to allow lasing. In this mode, it is possible to attain a single large pulse output from the laser. The frequency range of Q switching extends up to a range of 50 to 100 kHz, with no lower boundary. The upper repetition rate is limited by the finite time required to repump the inversion in the gain medium of the laser. To extend the upper repetition rate further, a cavity dumping technique must be used. In cavity dumping, energy is stored in the photon field of the laser instead of the atomic inversion. The photon field is generated between two mirrors of maximum reflectivity. To extract a pulse from the resonator, the beam is electro-optically or acousto-optically deflected out of the cavity between the two mirrors.

Repetition rates achievable with cavity dumping have been demonstrated between 125 kHz and 10 MHz. See W. Koechner, *Solid-State Laser Engineering*, New York: SpringerVerlag, 1976, pp. 444–446. The lower limit is reached when the photon field within the resonator is reduced to one photon after dumping the field. At this point the beginning of the build up is dependent on the statistical variance of spontaneous emission. Hence, if the cavity is dumped of all its energy, cavity dumping becomes unstable. If the cavity is not dumped of all its energy, for example by inducing an incomplete polarization flip with an electro-optic modulator, this lower limit can be extended. The upper rate of cavity dumping is limited by the switching time of the modulator. To extend pulse rates beyond 10 MHz, a mode locked laser must be used.

Additionally, frequency doubling of the laser radiation is often desired for efficient detection at the receiver. The frequency-doubling conversion efficiency is a function of the intensity in the nonlinear doubling crystal. As the intensity increases, the conversion efficiency also increases. Therefore, to maximize efficiency, intra-cavity doubling is desirable because photon flux levels are much higher inside the laser resonator.

Techniques for intra-cavity doubling of Q switched lasers are well known. However, intra-cavity frequency doubling/cavity dumping is less desirable since placing a frequency-doubling crystal in the primary cavity causes losses, thus reducing the stored energy in the laser resonator. Once the energy is frequency doubled it can no longer stimulate emission in the laser gain medium, and therefore will not experience gain in the laser resonator. On the other hand, in external frequency doubling, the fundamental wavelength that is undoubled is lost resulting in a lower conversion efficiency. It would be desirable to have external frequency doubling with cavity dumping while feeding back into the cavity undoubled frequency light for greater efficiency.

STATEMENT OF THE INVENTION

In accordance with the present invention, a laser resonator cavity is provided between two mirrors. Gain medium in the path between the two cavity mirrors receives pump energy to build up energy stored in the photon field of the laser. Means placed in the path of resonant light between the two mirrors is pulsed to electro-optically or acousto-optically deflect light out of the resonant path between the two mirrors and toward a third mirror which reflects light back into the resonant cavity. A frequency doubler is placed in the path of light to and from the third mirror to double a portion of the light making two passes through it, and transmit the remaining light undoubled in frequency back into said gain medium, and means for separating the frequency doubled light is placed between the frequency doubler and that part of the resonant cavity which includes the gain medium. The frequency doubled light is thus separated and transmitted out as a light pulse, while undoubled frequency light is returned to the part of the resonator cavity that includes the gain medium.

Since the output beam losses are low in cavity dumping, deflecting light (electro-optically or acousto-optically) out of the primary cavity maintains a high intensity beam, resulting in efficient frequency doubling. The third mirror used in conjunction with modulating means for deflecting light out of the primary resonant cavity, and placed near the second mirror with its optical axis at an angle to the axis of the primary cavity, reflects the undoubled frequency light back through the separating means to the laser gain medium, while reflecting out light that has undergone a doubling in frequency into a modulated output beam pulse, thus feeding back into the cavity undoubled frequency light for greater efficiency.

In the case of using an electro-optic modulator for cavity dumping and a type-I frequency doubler, a polarized beamsplitter is used to both redirect undoubled frequency light back through the gain medium and to separate out the frequency doubled pulse of light transmitted. When a type-II frequency doubler is used, a dichroic beamsplitter between the polarized beamsplitter and the frequency doubler separates out the frequency doubled light from undoubled light being redirected back through the gain medium.

In the case of using an acousto-optic modulator, which only deflects light and does not rotate polarization, a dichroic beamsplitter is employed to separate the frequency doubled light while undoubled light is fed back through the gain medium into the primary laser cavity.

The novel features that are considered characteristic of this invention are set forth with particularity in the appended claims. The invention will best be understood from the following description when read in connection with the accompanying drawings.

DETAILED DESCRIPTION OF THE DRAWINGS

Figure 1:
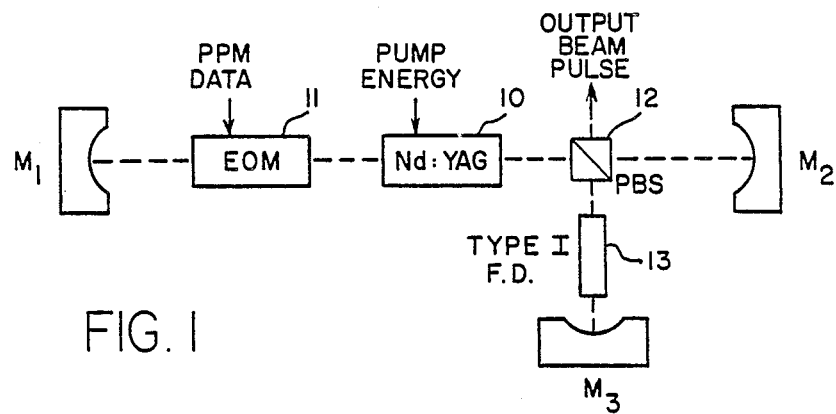
FIG. 1 illustrates schematically an electro-optic cavity-dumped laser according to the present invention applied to the example of PPM communication and utilizing a type I frequency doubler.
Figure 2:
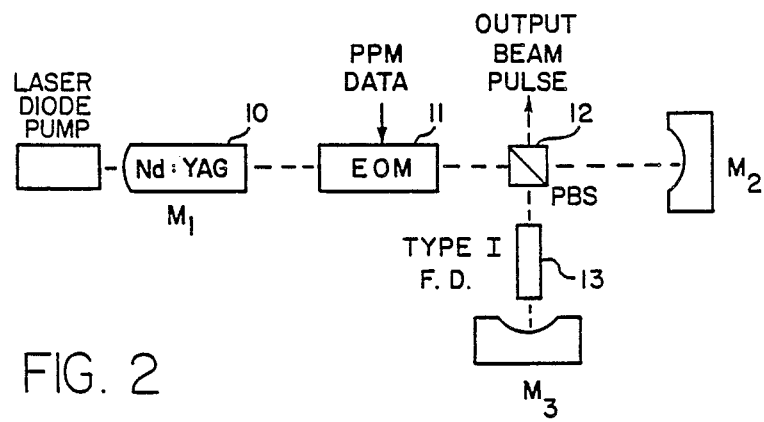
FIG. 2 illustrates a diode end-pumped variation of the cavity-dumped laser shown in FIG. 1.

FIG. 1 illustrates a first embodiment of the present invention used, for example, in a PPM communication transmitter. Other uses will occur to those skilled in the art. This first embodiment consists of 1.06 μm laser shown schematically as having an Nd:YAG crystal rod 10, mirrors $M_1$ and $M_2$ defining a resonant cavity, and a source of pump energy (not shown), which may be a flashlamp pump, or an array of semiconductor diodes positioned for end pumping as disclosed in U.S. Pat. No. 4,710,940. In order to compactly pump the laser rod 10 at one end with diodes instead of at one side, the pumped end of the laser rod must be polished in the shape of the cavity mirror required at the pumped end of the laser rod. That polished end is then coated directly to form the mirror $M_1$ through which pumping energy enters the laser rod. Therefore, the modulator 11 must be relocated on the other side of the laser rod as shown in FIG. 2.

In this standard arrangement for a cavity laser, which may be found in many commercial lasers, there is further incorporated within the resonant cavity an electro-optic modulator (EOM) 11 and a polarizing beamsplitter (PBS) 12. A type-I frequency doubler (FD) 13 is positioned outside the primary laser cavity in an optical path between the polarizing beamsplitter 12 and a third mirror $M_3$ arranged with its optical axis at a 90° angle with the axis of the primary laser cavity. Other angles may be required with other types of polarizing prisms for the beamsplitter 12. This arrangement incorporates both cavity dumping and frequency doubling while redirecting the undoubled frequency light back into the gain medium of the laser, namely the Nd:YAG crystal of the laser rod 10.

Figure 1A:
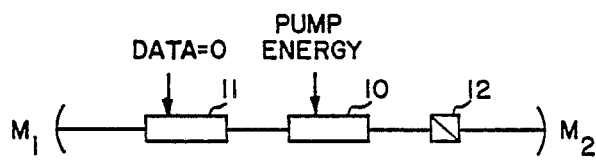
FIG. 1a illustrates operation of the laser while not dumping.
Figure 3:
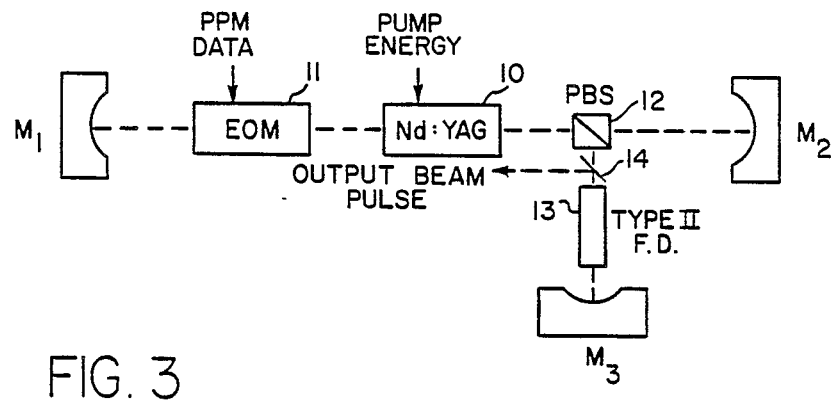
FIG. 3 illustrates a variation of FIG. 1 utilizing a type II frequency doubler.

Although a preferred embodiment illustrated employs an electro-optic modulator, an acousto-optic modulator may be employed for cavity dumping, as will be described with reference to FIG. 3. Consequently, the electro-optic modulator 11 shown in FIG. 1 will sometimes hereinafter be referred to as a "polarization modulator" which receives electric PPM data pulses from a source (not shown). The electric field applied to the polarization modulator 11 is normally zero, allowing the photon field in the resonant cavity between mirrors $M_1$ and $M_2$ to build up, as shown in FIG. 1a. The polarizing beam-splitter (PBS) initially polarizes the light horizontally in the resonator cavity. To transmit a laser beam pulse, an electric field transverse to the horizontally polarized initial beam is applied to the data modulator 11 by a control signal (shown as a PPM data signal by way of example and not limitation) to induce a quarter-wave phase retardation to the beam passing through it. A double pass through the modulator thus induces a half-wave phase shift, resulting in a 90° rotation of the light polarization, which is then reflected by the polarized beamsplitter through the frequency doubler 13 to the mirror $M_3$.

A crystal of $KTiOPO_4$ (commonly referred to as simply KTP) is used for the frequency doubler 13. This crystal exhibits a very high frequency doubling efficiency at 1.00 μm. It is nonhydroscopic, has a high damage threshold, and is thermally stable with a wide angular and thermal bandwidth when phase matched in a type II configuration. See Y. S. Liu, L. Drafall, D. Dentz and R. Belt, "Nonlinear Optical PhaseMatching Properties of $KTiOPO_4$," *G. E. Technical Information Series Report*, 82 CRD -16, Feb. (1982). Conversion efficiencies between 30–45% can be achieved with KTP. Both type-I and type-II frequency doubling crystals are commercially made from KTP: the difference is only in the angle at which the crystal is cut relative to its crystalline axis. While type-II frequency doubling crystals are optimal, there is still a very large percentage of the light not doubled in frequency. A feature of this invention is to redirect light of undoubled frequency back into the primary laser cavity, and couple out only light of doubled frequency.

Figure 1B:
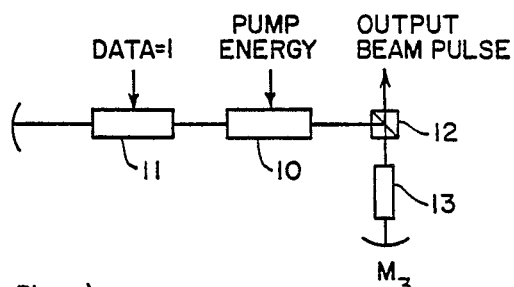
FIG. 1b illustrates operation in the dumping mode for producing an output beam pulse.

When a type-I frequency doubler is used, it converts one vertically polarized photon into two horizontally polarized photons. Consequently, the portion of the horizontally polarized initial beam that is doubled in frequency in its double pass through the frequency coupler will be rotated 90°, resulting in horizontally polarized light that passes through the polarizing beamsplitter to provide an output beam pulse, as shown in FIG. 1b. In that manner, the photon field in the resonator cavity between mirrors $M_1$ and $M_2$ experience cavity dumping to transmit a laser beam pulse of light at double frequency in response to a control signal.

If a type-II frequency doubler is used, which converts one vertically polarized photon into one horizontally polarized photon and one vertically polarized photon, the frequency doubled light is rotated only 45°. Consequently, only part of the frequency-doubled light would have a horizontally polarized vector and be transmitted out. In order to have all of the frequency doubled light transmitted out, a dichroic beamsplitter 14 is used to effectively couple out the doubled (0.532 μm) portion of the beam as shown in FIG. 3. Light that is not frequency doubled is not rotated 45°, and remains vertically polarized. As long as an electric field is applied to the modulator 11, the undoubled (1.06 μm) light will be preserved and rotated back to the original horizontal polarization. When an output pulse of frequency-doubled light has been attained for the desired duration (pulse width), typically 10–20 ns, the electric field is switched to zero by the control signal. The photon field in the primary laser cavity (kept alive by the returned light that is not frequency doubled) is then allowed to build up once again for transmission of another light pulse.

Figure 4:
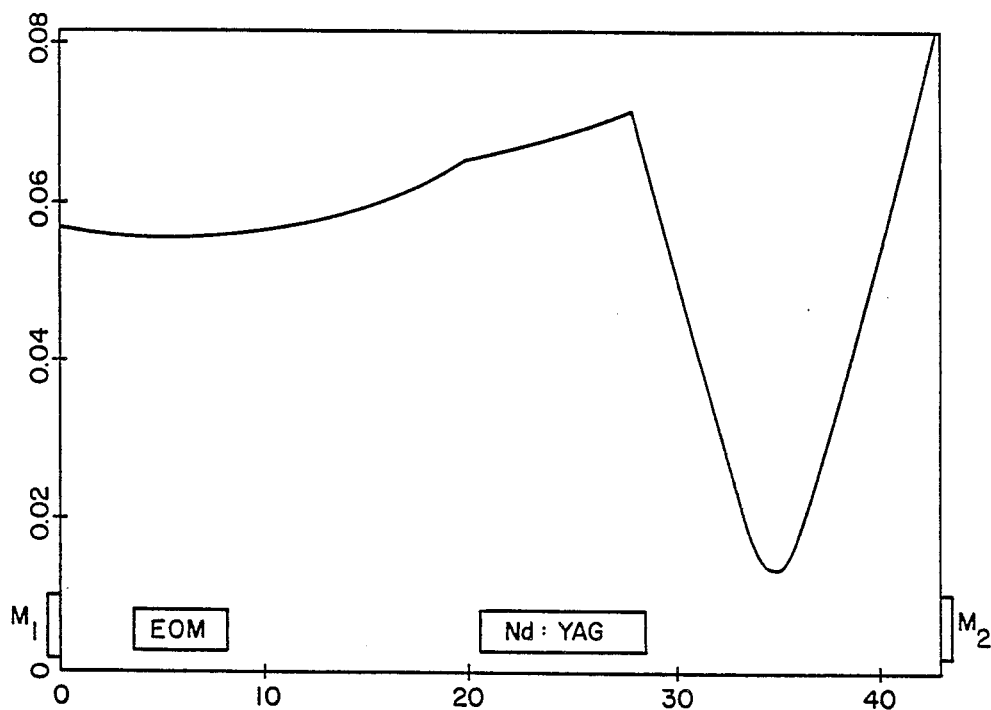
FIG. 4 is a graph of laser beam diameter as a function laser cavity length for the arrangement of FIG. 1.

Appropriate beam wastes and mirror reflectivities within the laser cavity for frequency doubling and cavity dumping, as well as the aperture of the modulator, will now be discussed with reference to FIG. 4 in which the diameter of the spatial mode is plotted versus the length of the resonator cavity. Since the efficiency of frequency doubling increases proportionately with the optical intensity, a tightly focused beam should be coupled into the doubling crystal by the polarizing beamsplitter. Consequently, between the laser rod 10 and the second mirror $M_2$, a tight focus is formed, as indicated by the sharp dip in the graph. Thus, when the modulator 11 rotates polarization, causing the beam to be deflected by the polarized beamsplitter 12 into the third mirror $M_3$, the beam should be tightly focused in the doubling crystal 13. A second design limitation is the aperture size of the modulator 11. Mirror curvatures are to be optimized until desired beam wastes within the cavity are formed.

To maintain a low half-wave voltage on the modulator implemented as an electro-optic modulator, a LiNbO$_3$ or LiTaO$_3$ crystal is to be used. These crystals require lower half-wave voltages than traditionally used crystals like KDP, which requires half-wave voltages of approximately 3 kV and is hydroscopic. LiNbO$_3$ and LiTaO$_3$ are both trigonal, 3 m symmetry, non-hydroscopic crystals that require half-wave voltages between 500–900 volts, resulting in power consumptions between 0.5 to 2.5 Watts.

Figure 5:
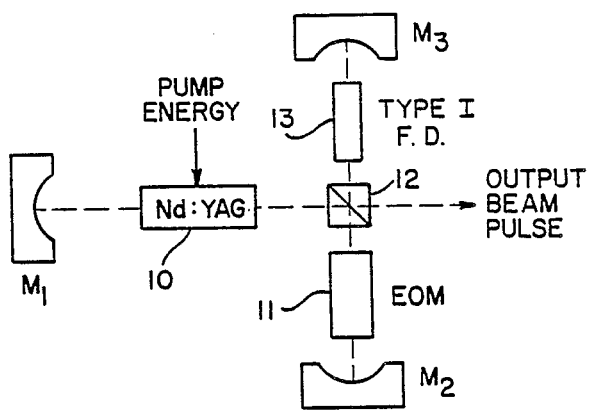
FIG. 5 illustrates a variation in the arrangement of parts in the embodiment of FIG. 1, and FIGS. 5a and 5b illustrate operation during a buildup phase and during a cavity dump phase, respectively.
Figure 5A:
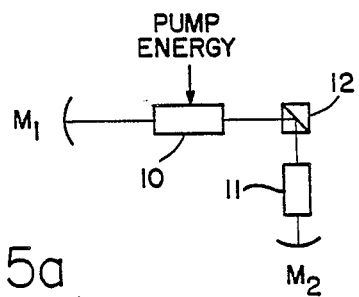
Figure 5B:
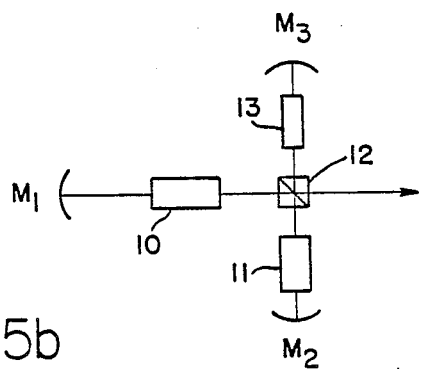

A variation of the arrangement of the parts in FIG. 1 is illustrated in FIG. 5, with each part identified by the same reference numeral as in FIG. 1. The electro-optic modulator 11 is now placed on the opposite side of the gain medium 10 and the polarizing beamsplitter 12. While the modulator is not being activated by a data pulse, the horizontally polarized light is reflected by the polarizing beamsplitter and passes through the modulator 11 to the mirror $M_2$. The resonant cavity is thus divided into two parts by the polarizing beamsplitter at right angles to each other, as shown in FIG. 5a for the buildup phase. When modulator 11 is being activated, a percentage of the light making a double pass through it is rotated to vertically polarized light. The vertically polarized light passes through the polarizing beamsplitter and through a type-I frequency doubler 13. Upon reflection by a third mirror $M_3$, it passes back through the frequency doubler 13 which thus rotates it 90° to horizontally polarized light. The polarizing beamsplitter therefore reflects the frequency doubled light out as an output beam pulse. Light not doubled in frequency is not rotated 90°, so it passes back through the polarizing beamsplitter as vertically polarized light. The modulator 11 rotates the vertically polarized light back to horizontally polarized light on its return from the mirror $M_2$. That light not frequency doubled will thus have been rotated back to horizontally polarized light for reflection by the polarizing beamsplitter back into the gain medium. The arrangement of FIG. 5 thus accomplishes the same thing as the arrangement of FIG. 1 in essentially the same way.

Figure 6:
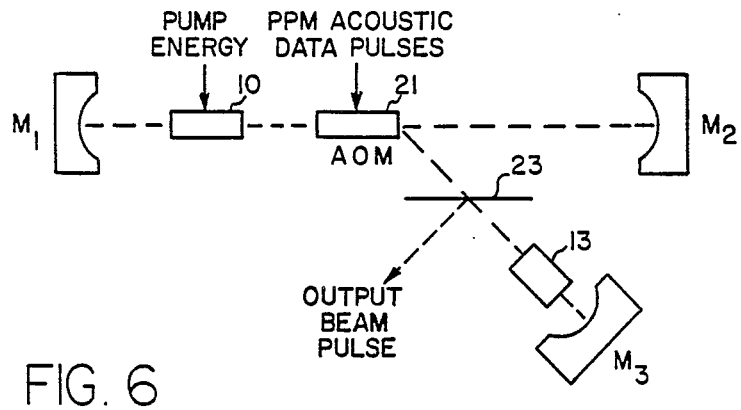
FIG. 6 illustrates schematically a frequency doubled acousto-optic cavity-dumped laser as an alternative embodiment of the present invention.
Figure 6A:
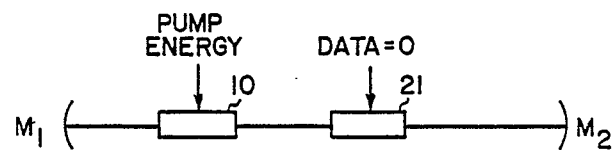
FIGS. 6c and 6b illustrate operation of the laser during a build-up phase and during a cavity-dump phase, respectively.
Figure 6B:
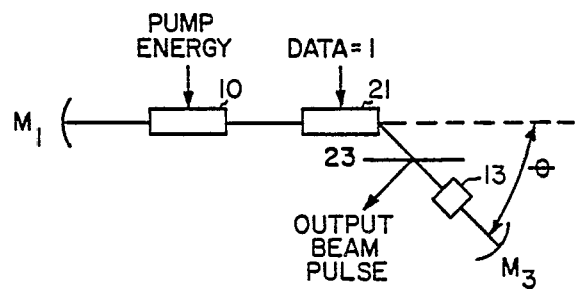

Referring now to the acousto-optic species of FIG. 6, the same reference numerals are used for the same components as in FIG. 1 for convenience, and new reference numerals are employed for the new components used in an analogous way. The new components are an acousto-optic modulator (AOM) 21 used in place of the electro-optic modulator 11, and a dichroic beam-splitter 23 used in place of the polarizing beamsplitter 12. The acousto-optic modulator transmits light in the resonant cavity between mirrors $M_1$ and $M_2$ during a build-up phase of operation shown in FIG. 6a during which the crystal rod 10 is pumped from a source of energy (not shown). For the transmission of a frequency doubled light pulse, a PPM acoustic wave is applied to the acousto-optic modulator 21 which sets up a diffraction grating within the opto-acoustic modulator to deflect the laser light beam through an angle $\theta$, as shown in FIG. 6b.

The deflected light passes through the dichroic beamsplitter 23 and the frequency doubler 13 to the third mirror $M_3$. During this cavity-dump phase, light in this branch of the cavity is reflected by the frequency selective dichroic beamsplitter as a frequency-doubled output beam pulse. Light not frequency doubled is not reflected from the dichroic beam-splitter 23 and passes through to the acousto-optic modulator 21 and the crystal rod 10.

While a crystal rod has been illustrated and referred to as the gain medium in the preferred embodiments, it is evident that the gain medium may be a gas or liquid in a cylinder, with a window at each end, replacing the solid gain medium in FIGS. 1–6 shown as Nd:YAG, for example, formed in the shape of a rod with a polished window at each end.

An arrangement has been described for efficient frequency doubling while cavity dumping a pumped laser. This technique is useful for many different purposes, such as modulating an optical communications link at data rates between 1 Mbits/sec and 80 Mbits/sec (assuming nominal laser repetition rates of 126 kHz to 10 MHz with M=256). However, the invention is not limited to that communications application; it may be used in any application requiring the timing of output beam pulses.

Although particular embodiments of the invention have been described and illustrated herein, it is recognized that modifications and variations may readily occur to those skilled in the art. Consequently, it is intended that the claims be interpreted to cover such modifications and variations.

We claim:

1. Apparatus for efficient frequency doubling while cavity dumping a pumped laser in a resonator cavity in order to produce modulated output light pulses comprising
    a laser having a pumped gain medium in said resonator cavity for emitting light at a first frequency on a fixed axis between two mirrors,
    modulating means placed between one of said two mirrors and said gain medium for deflecting light in said resonant cavity along a path at a fixed angle with respect to said fixed axis between said two mirrors in response to a cavity-dumping control signal, a third mirror placed to receive resonant cavity light deflected by said modulating means, and to redirect it back on the same path, frequency doubling means placed in said deflected light path between said modulating means and said third mirror, and beamsplitting means placed between said frequency doubling means and said modulating means for separating out frequency doubled light as a modulated output pulse, and passing undoubled frequency light through said modulating means and said gain medium, whereby light in said resonator cavity between said two mirrors experiences cavity dumping and frequency doubling while transmitting a modulated pulse of light reflected from said third mirror and redirection of undoubled frequency light into said resonator cavity while transmitting said modulated pulse of light for greater efficiency.

2. Apparatus for efficient frequency doubling while cavity dumping a pumped laser gain medium in order to produce modulated output light pulses comprising a laser having a pumped gain medium for emitting light at a first frequency within a resonant cavity on a fixed axis between first and second mirrors defining said cavity, means placed between one of said first and second mirrors and said gain medium for modulating the polarization of light in said resonant cavity between horizontal and vertical polarization in response to a cavity-dumping control signal as said resonant light makes two passes through said modulating means in said resonant cavity, a polarizing beamsplitter placed between said second mirror and said gain medium, and oriented to pass resonant cavity light from said gain medium that is horizontally polarized to said second mirror, and to deflect deflected resonant cavity light from said gain medium that is vertically polarized through a fixed angle, a third mirror placed to receive resonant cavity light deflected through said fixed angle by said polarizing beamsplitter, and to reflect it back in the same path through said polarizing beamsplitter to said gain medium, and a frequency doubling and polarization rotation means placed on said path between said polarizing beamsplitter and said third mirror for rotating at least some vertically polarized light to horizontally polarized light at double the frequency of light deflected by said polarizing beamsplitter, whereby light in said resonator cavity between said first and second mirrors experience cavity dumping while transmitting a pulse of frequency doubled light reflected from said third mirror, and redirection of undoubled frequency light into said resonator cavity while transmitting said pulse of frequency doubled light for greater efficiency.

3. Apparatus as defined in claim 2 wherein said frequency doubling and polarization rotation means is a type-II frequency doubler which produces frequency doubled light and including a dichroic beamsplitter oriented in said path between said polarizing beamsplitter and said type-II frequency doubler to reflect frequency doubled light in a direction 90° from said path between said polarizing beamsplitter and said type-II frequency doubler.

4. Apparatus for efficient frequency doubling while cavity dumping a pumped laser in order to produce modulated output light pulses comprising a laser having a pumped gain medium for emitting light at a first frequency within a resonant cavity on a fixed axis between first and second mirrors, modulating means placed between one of said first and second mirrors and said gain medium for modulating the polarization of light in said resonant cavity between horizontal and vertical polarization in response to control signals as said resonant light makes two passes through said modulating means in said resonant cavity, a polarizing beamsplitter placed between said second mirror and said gain medium, and oriented to pass light horizontally polarized to said second mirror and to deflect light that is vertically polarized to a path at a fixed angle with respect to said fixed cavity axis, a third mirror placed on said path to receive resonant cavity light from said beamsplitter, and to reflect light back on the same path to said beamsplitter, a dichroic beamsplitter placed between said third mirror and said polarizing beamsplitter and oriented to pass light in one direction to said third mirror and to pass or deflect light reflected by said third mirror according to whether or not reflected light is frequency doubled, and a type-II frequency doubler between said dichroic beamsplitter and said third mirror for doubling the frequency of at least a portion of light deflected by said polarizing beamsplitter and transmitted through said dichroic beamsplitter and reflected by said third mirror, said type-II frequency doubler thereby efficiently coupling out frequency doubled light by said dichroic beamsplitter while redirecting back into said gain medium light reflected by said third mirror and not doubled in frequency by said frequency doubler.

5. Apparatus for efficient frequency doubling while cavity dumping a pumped laser in order to produce modulated output light pulses comprising a laser having a continuously pumped gain medium for emitting light at a first frequency within a resonant cavity on a fixed axis between first and second mirrors defining said cavity, acousto-optic modulating means placed between one of said first and second mirrors and said gain medium for deflecting the axis of light in said resonant cavity from said gain medium by a fixed angle $\theta$ in response to an acoustic wave pulse, a third mirror placed to receive deflected resonant cavity light from said modulating means, and to reflect back on the same path light received, frequency doubling means placed on said deflected path between said third mirror and said acousto-optic modulating means, and a dichroic beamsplitter placed between said frequency doubling means and said acousto-optic modulating means, said dichroic beamsplitter being oriented to pass light at the resonant frequency of said resonant cavity in both directions and to deflect frequency doubled light received from said frequency doubling means.

6. A laser comprising gain medium between two mirrors which define a resonant cavity, means placed in the path of resonant light between said two mirrors for electro-optically or acousto-optically deflecting light out of said resonant cavity path between said two mirrors and toward a third mirror positioned to reflect light back into said gain medium in said resonant cavity, a frequency doubler positioned in the path of deflected light to and from said third mirror to double a portion of deflected light reflected back through said frequency doubler, and transmit back into said gain medium the balance of said deflected light undoubled in frequency, and means for separating the frequency doubled light passing through said frequency doubler from said light undoubled in frequency, said separating means being positioned between said frequency doubler and said gain medium.

7. A laser as defined in claim 6 wherein said frequency doubler is a type-I frequency doubler and said means for deflecting light out of said resonant cavity path is comprised of an electro-optical modulator and a polarizing beamsplitter, and said separating means is comprised of said polarizing beamsplitter.

8. A laser as defined in claim 7 wherein said means for deflecting light out of said resonant cavity between said two mirrors and toward a third mirror is placed between said polarizing beamsplitter and one of said two mirrors, and said frequency doubler of type-I is positioned on the opposite side of said polarizing beamsplitter.

9. A laser as defined in claim 6 wherein said frequency doubler is a type-II frequency doubler and said means for deflecting light out of said resonant cavity path is comprised of an electro-optical modulator and a polarizing beamsplitter, and said separating means is comprised of a dichroic beamsplitter.

10. A laser as defined in claim 6 wherein said means for deflecting light out of said resonant cavity path is comprised of an acousto-optical modulator, and said separating means is comprised of a dichroic beamsplitter.

* * * * *